United States Patent
Tao

(10) Patent No.: US 12,147,613 B2
(45) Date of Patent: Nov. 19, 2024

(54) CONTROL METHOD, VIRTUAL REALITY SYSTEM, AND NON-TRANSITORY COMPUTER READABLE STORAGE MEDIUM WITH MAP OF HEAD-MOUNTED DEVICE

(71) Applicant: HTC Corporation, Taoyuan (TW)

(72) Inventor: Sheng-Hui Tao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/817,353

(22) Filed: Aug. 4, 2022

(65) Prior Publication Data

US 2023/0176662 A1 Jun. 8, 2023

Related U.S. Application Data

(60) Provisional application No. 63/264,953, filed on Dec. 6, 2021, provisional application No. 63/264,956, filed on Dec. 6, 2021, provisional application No. 63/264,955, filed on Dec. 6, 2021.

(51) Int. Cl.
*G06F 3/0346* (2013.01)
*G06F 3/038* (2013.01)
*G06F 3/14* (2006.01)

(52) U.S. Cl.
CPC ............ *G06F 3/0346* (2013.01); *G06F 3/038* (2013.01); *G06F 3/14* (2013.01)

(58) Field of Classification Search
CPC .................................................. G06F 3/0346
See application file for complete search history.

(56) References Cited

U.S. PATENT DOCUMENTS

| | | | |
|---|---|---|---|
| 10,152,141 B1* | 12/2018 | Lohse | G06F 3/014 |
| 10,185,775 B2 | 1/2019 | Schmalstieg et al. | |
| 10,565,731 B1 | 2/2020 | Reddy et al. | |
| 11,568,562 B1 | 1/2023 | D'Amico | |
| 2014/0267234 A1 | 9/2014 | Hook et al. | |
| 2015/0205135 A1* | 7/2015 | Border | G06V 20/20 |
| | | | 359/630 |
| 2016/0179830 A1 | 6/2016 | Schmalstieg et al. | |
| 2017/0011555 A1* | 1/2017 | Li | G02B 27/0101 |
| 2017/0161956 A1* | 6/2017 | Fu | G06F 3/012 |

(Continued)

FOREIGN PATENT DOCUMENTS

| | | |
|---|---|---|
| TW | 202009786 A | 3/2020 |
| TW | 202105133 A | 2/2021 |

OTHER PUBLICATIONS

The office action of the corresponding Taiwanese application No. TW111144045 issued on Jul. 11, 2023.

(Continued)

*Primary Examiner* — William Boddie
*Assistant Examiner* — Andrew B Schnirel
(74) *Attorney, Agent, or Firm* — CKC & Partners Co., LLC

(57) ABSTRACT

A control method, suitable for a virtual reality system including a head-mounted device (HMD device) and a tracking device, is disclosed. The control method includes the following operations: showing a first marker on a screen of the HMD device, in which the first marker is generated according to a capability of a camera of the HMD device; and localizing the tracking device with an HMD map of the HMD device when the tracking device is aligned with the first marker by the tracking device.

18 Claims, 6 Drawing Sheets

(56) References Cited

U.S. PATENT DOCUMENTS

| | | | |
|---|---|---|---|
| 2017/0244811 A1* | 8/2017 | Mckenzie | H04W 76/14 |
| 2017/0330387 A1* | 11/2017 | Dearman | G06F 3/011 |
| 2018/0365853 A1 | 12/2018 | Yang et al. | |
| 2019/0244416 A1 | 8/2019 | Tamaoki et al. | |
| 2019/0385370 A1* | 12/2019 | Boyapalle | G06F 3/012 |
| 2020/0027274 A1 | 1/2020 | Suzuki et al. | |
| 2020/0158517 A1 | 5/2020 | Tadi et al. | |
| 2020/0363867 A1* | 11/2020 | Azimi | G06F 3/013 |
| 2021/0011556 A1* | 1/2021 | Atlas | G06F 3/011 |

OTHER PUBLICATIONS

The office action of the related U.S. Appl. No. 17/817,355 issued on Sep. 3, 2024.

* cited by examiner

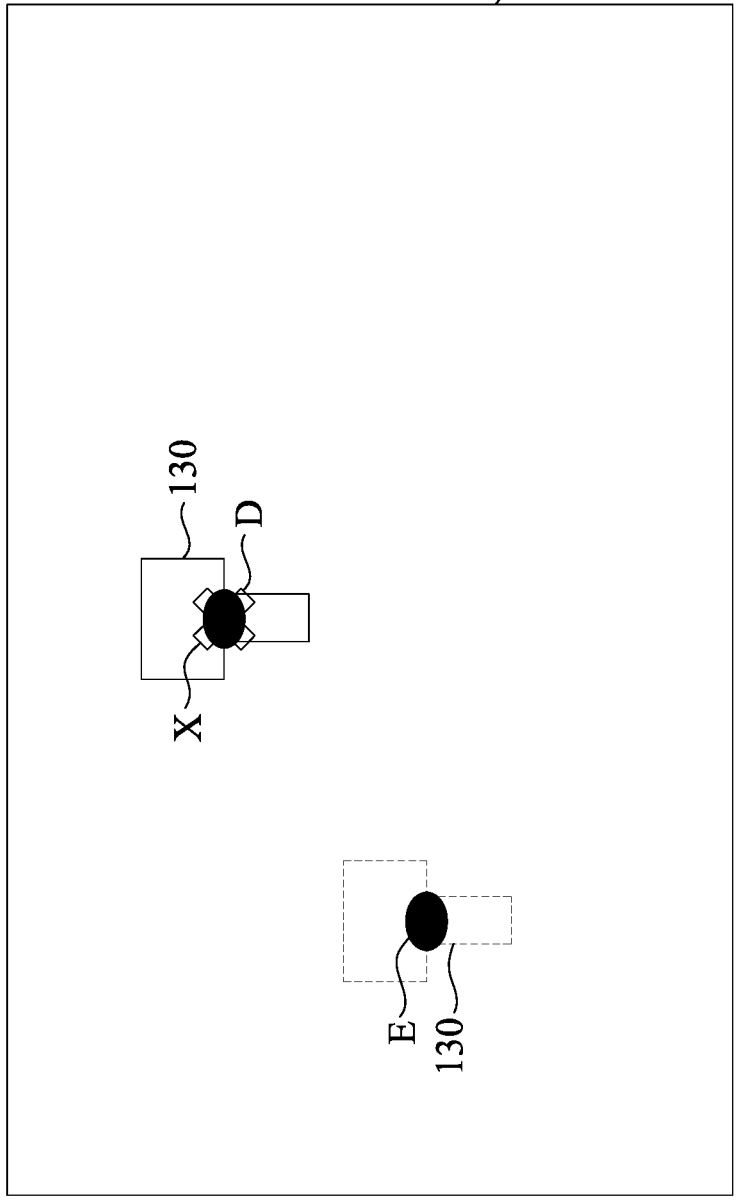

CONTROL METHOD, VIRTUAL REALITY SYSTEM, AND NON-TRANSITORY COMPUTER READABLE STORAGE MEDIUM WITH MAP OF HEAD-MOUNTED DEVICE

CROSS-REFERENCE TO RELATED APPLICATION

This application claims priority to U.S. Provisional Application Ser. No. 63/264,953, filed Dec. 6, 2021, U.S. Provisional Application Ser. No. 63/264,955, filed Dec. 6, 2021, and U.S. Provisional Application Ser. No. 63/264,956, filed Dec. 6, 2021, which is herein incorporated by reference.

FIELD OF INVENTION

The present application relates to a control method, a virtual reality system, and a non-transitory computer readable storage medium. More particularly, the present application relates to a control method, a virtual reality system, and a non-transitory computer readable storage medium with a map of the environment.

BACKGROUND

A virtual reality (VR) system is developed to provide users with an immerse experience. When the user wears the head-mounted display device (HMD device), the user's field of view will be covered by the content displayed by the HMD device. The VR system also includes a tracking device or a controller, which is held by the user for the user to interact with the VR system through the tracking or the controller.

The VR system may be used to create and track on the three dimensional map environments (e.g., Simultaneous Localization and Mapping). Usually, the map of the environment is detected and created by the HMD device, and the tracking device or the controller relocates itself with the map created by the HMD device. However, since the capability of the tracking device or the controller is different from that of the HMD device, it is hard for the tracking device or the controller to relocate with the map created by the HMD.

SUMMARY

The disclosure provides a control method, suitable for a virtual reality system including a head-mounted device (HMD device) and a tracking device. The control method includes the following operations: showing a first marker on a screen of the HMD device, in which the first marker is generated according to a capability of a camera of the HMD device; and localizing the tracking device with an HMD map of the HMD device when the tracking device is aligned with the first marker by the tracking device.

The disclosure provides a virtual reality system, including a head-mounted display device (HMD device) and a tracking device. The HMD device includes a host memory, and a host processor. The host memory is configured to store an HMD map. The host processor is coupled to the host memory and is configured to show a first marker on a screen of the HMD device, in which the first marker is generated according to a capability of a camera of the HMD device. The tracking device is communicatively connected to the HMD device. The tracking device includes a client processor. The client processor is configured to localize the tracking device with the HMD map when the tracking device is aligned with the first marker.

The disclosure provides a non-transitory computer readable storage medium with a computer program to execute aforesaid control method.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

FIG. 6 is a schematic diagram illustrating a calibration process according to some embodiments of the present disclosure.

DETAILED DESCRIPTION

Figure 1:
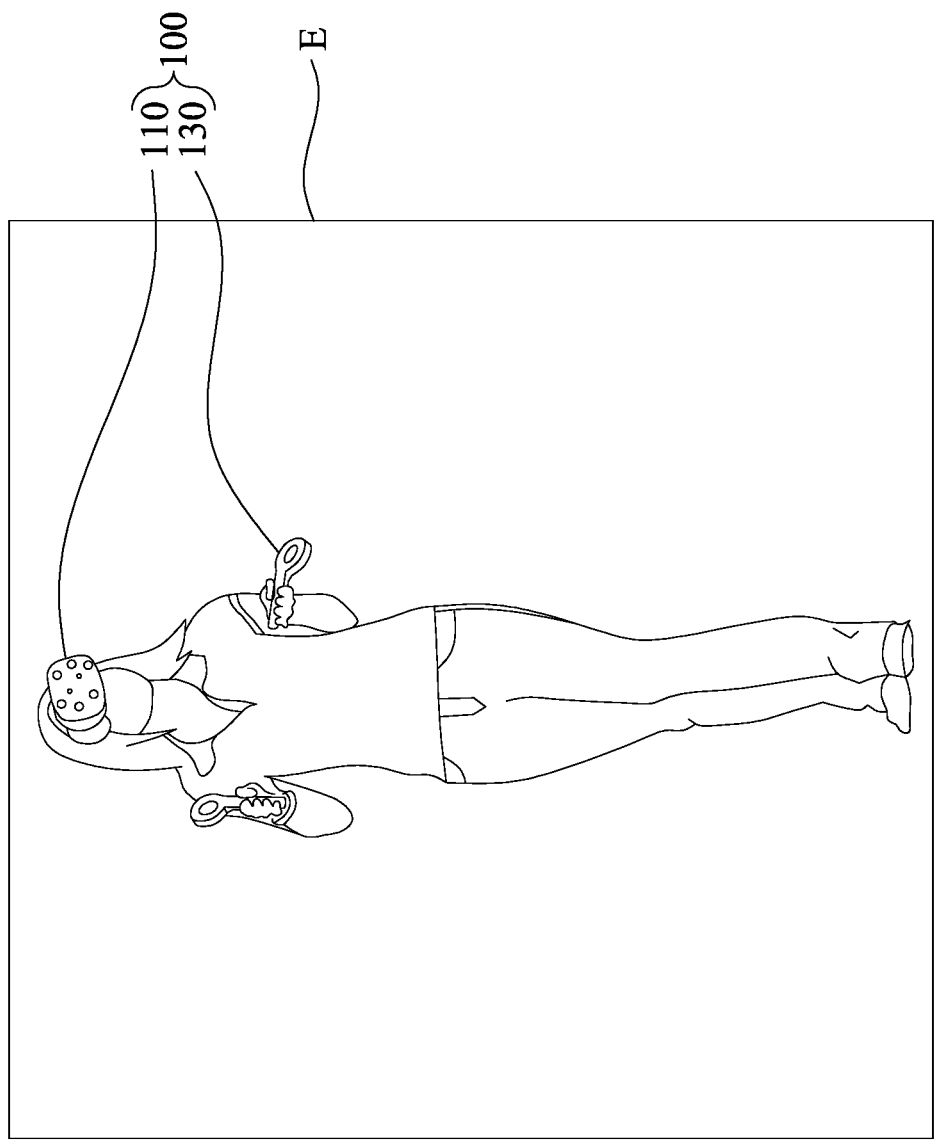
FIG. 1 is a schematic diagram illustrating a virtual reality (VR) system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a virtual reality system (VR system) 100 according to some embodiments of the present disclosure.

As shown in FIG. 1, the virtual reality system 100 includes a HMD device (head-mounted display device) 110 and a tracking device 130. The HMD device 110 can be disposed on a VR headset, which is wearable on a user. When a user wears the VR headset, the HMD device 110 will cover visions of the user, and the HMD device 110 is configured to provide virtual reality visions to the user. In some embodiments, the virtual reality visions are shown on a screen of the HMD device 110. In some embodiments, the tracking device 130 is a self-tracking device, which is held by the user and may be controlled by the user.

In some embodiments, the HMD device 110 works as a host device, and the tracking device 130 works as a client device. In some embodiments, the HMD device 110 and the tracking device 130 are communicatively connected to each other.

As shown in FIG. 1, the user is operating the virtual reality system 100 in an environment E. In some embodiments, the virtual reality system 100 constructs or updates a map of the unknown environment E while simultaneously keeping track of the location of the virtual reality system 100 within the environment E.

Figure 2:
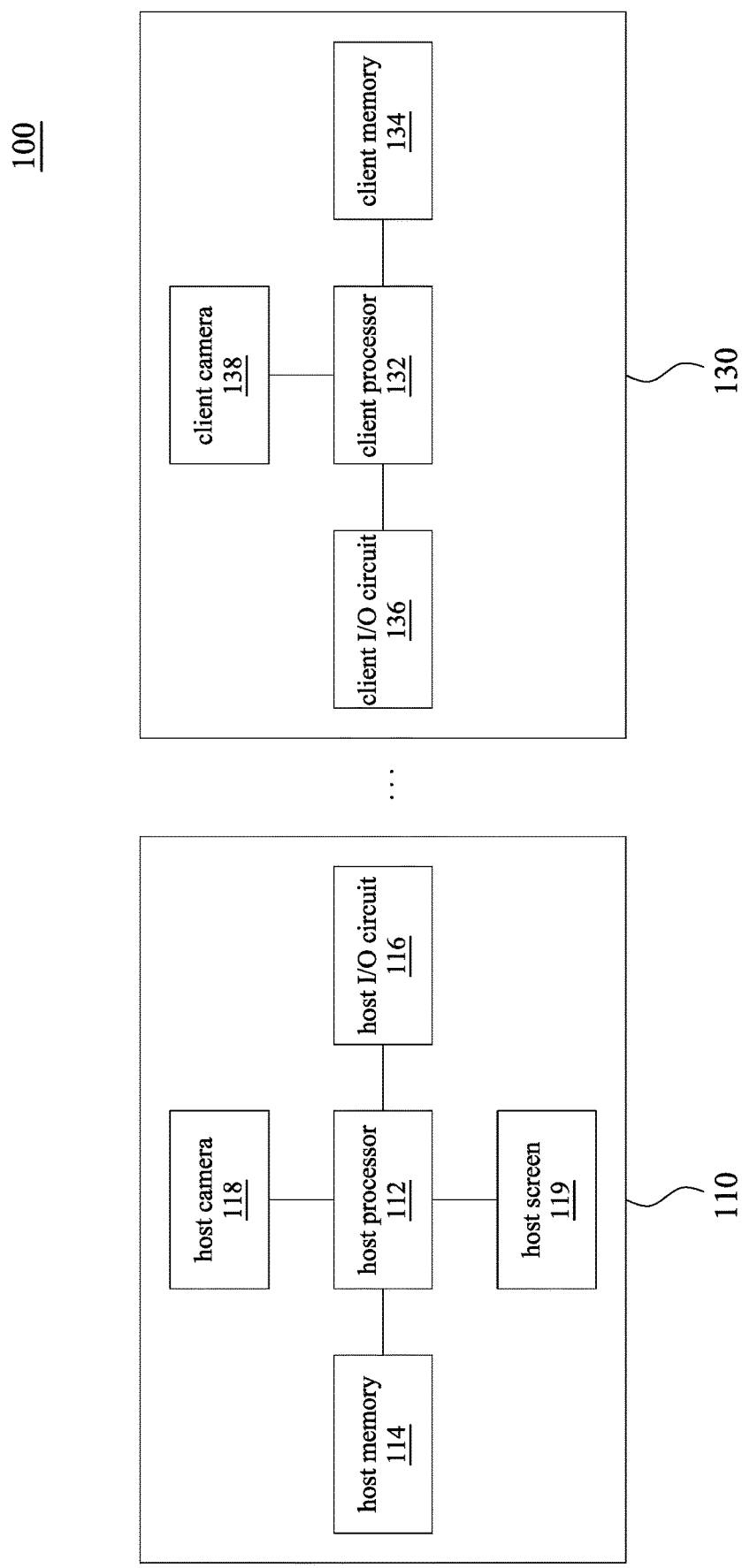
FIG. 2 is a schematic diagram illustrating the virtual reality system as illustrated in FIG. 1 according to some embodiments of the present disclosure.

Reference is made to FIG. 2. FIG. 2 is a schematic diagram illustrating the virtual reality system 100 as illustrated in FIG. 1 according to some embodiments of the present disclosure. As illustrated in FIG. 2, the HMD device 110 includes a host processor 112, a host memory 114, a host I/O circuit 116, a host camera 118, and a host screen 119. The host processor 112 couples to the host memory 114, the host I/O circuit 116, the host camera 118, and the host screen 119. The tracking device 130 includes a client processor 132, a client memory 134, a client I/O circuit 136, and a client camera 138. The client processor 132 is coupled to the client memory 134, the client I/O circuit 136, and the client camera 138.

In some embodiments, the HMD device 110 sends or receives information/data or signals through the host I/O circuit 116, and the tracking in device 130 sends or receives information/data or signals through the client I/O circuit 136.

Assume both of the HMD device 110 and the tracking device 130 work with a SLAM system. The host memory 114 of the HMD device 110 stores an HMD map generated by the host processor 112. In detail, the host camera 118 detects the environment E as illustrated in FIG. 1 and constructs the HMD map. Therefore, the HMD map is generated according to the capability of the host camera 118.

When the capability of the host camera 118 of the HMD device 110 and the capability of the client camera 138 of the tracking device 130 are different, the HMD map can not be applied directly to the tracking device 130. For example, in some embodiments, the placement angle of the camera 118 is different from the placement angle of the camera 138, and the HMD map cannot be applied directly to the tracking device 130.

For example, if the placement angle of the host camera 118 is upward relative to the host screen 119 of the HMD device 110, the angle of view of the host camera 118 is upward relative to the host screen 119 of the HMD device 110. On the other hand, the placement angle of the client camera 138 is forward relative to the client screen (not shown) of the tracking device 130, then the angle of view of the client camera 138 is forward, or perpendicular to the client screen of the tracking device 130.

Since the placement angle of the host camera 118 is upward relative to the host screen 119 of the HMD device, the features of the environment E are upward features relative to the HMD device. When the HMD device 110 constructs the HMD map according to the host camera 118, the HMD map is constructed according to the upward features, and the HMD map is not suitable for the tracking device 130.

Therefore, since the placement angles between the host camera 118 and the client camera 138 are different, the HMD map constructed by the host camera 118 is not suitable for the tracking device 130 even both of the host camera 118 and the client camera 138 are located in the same environment E, and a control method is in need for localizing the tracking device 130 to the HMD map.

Figure 3:
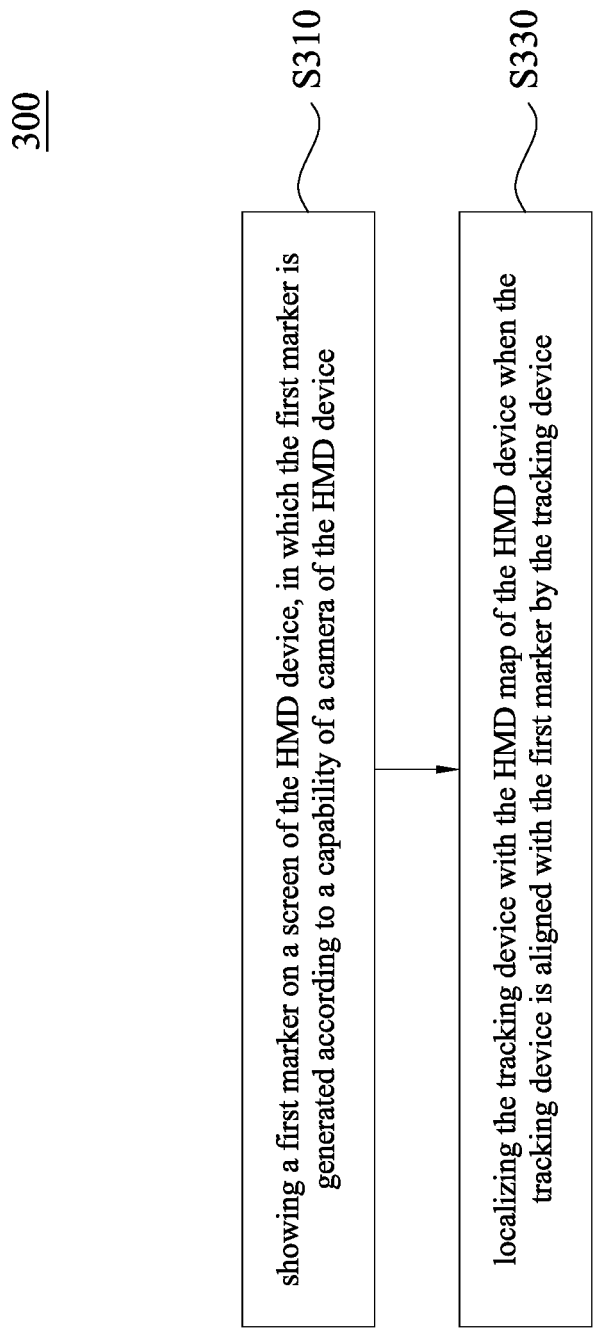
FIG. 3 is a flow chart diagram illustrating a control method according to some embodiments of the present disclosure.

Reference is made to FIG. 3. FIG. 3 is a flow chart diagram illustrating a control method 300 according to some embodiments of the present disclosure. The control method 300 is suitable to be executed by the virtual reality system 100 in FIG. 1 and FIG. 2. The control method 300 includes operations S310 to S330.

In operation S310, a first marker is shown on a screen of the HMD device, in which the first marker is generated according to a capability of a camera of the HMD device. Reference is made to FIG. 2 together. In some embodiments, in operation S310, the first marker is shown on the host screen 119 of the HMD device 110, and the first marker is generated according to the capability of the host camera 118 of the HMD device 110. In some embodiments, the capability of the camera includes a placement angle of the camera.

Figure 4:
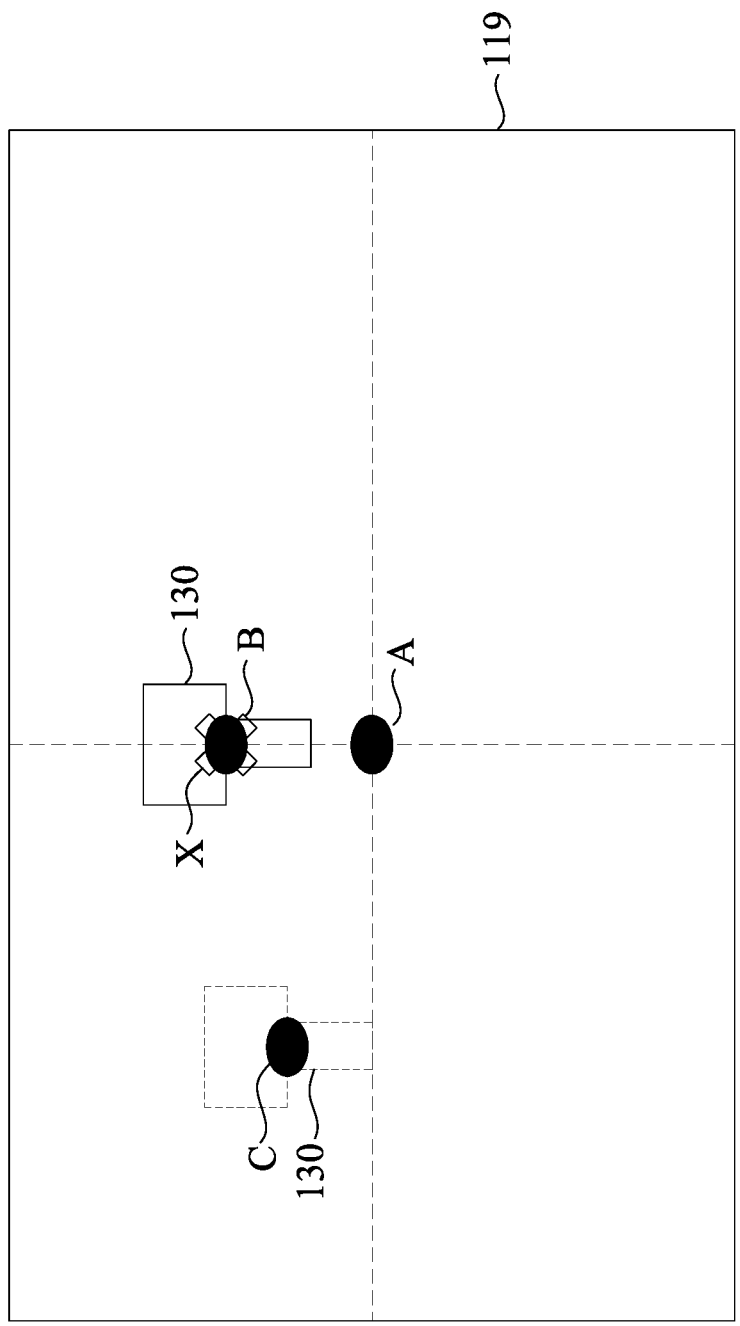
FIG. 4 is a schematic diagram illustrating a picture shown on the host screen according to some embodiments of the present disclosure.

Reference is made to FIG. 4 together. FIG. 4 is a schematic diagram illustrating a picture 400 shown on the host screen 119 according to some embodiments of the present disclosure.

As illustrated in FIG. 4, if the placement angle of the host camera 118 of the HMD device 110 is forward relative to the HMD device 110, the marker X shown on the host screen 119 is located at the point A. If the placement angle of the host camera 118 of the HMD device 110 is 30 degrees upward relative to the HMD device 110, the marker X shown on the host screen 119 is located at the point B.

In operation S330, the tracking device is localized with the HMD map of the HMD device when the tracking device is aligned with the first marker by the tracking device. In some embodiments, in operation S330, the tracking device 130 is localized with the HMD map of the HMD device 110 when the tracking device 130 is aligned with the marker X by the tracking device 130.

In some embodiments, the user in FIG. 1 sees the marker X located at the point B on the host screen 119 as illustrated in FIG. 4, and the user moves the tracking device 130 so that the tracking device 130 is aligned with the marker X, as illustrated in FIG. 4. When the tracking device 130 is aligned with the marker X at point B, the tracking device 130 acknowledges the capability, including the placement angle, of the host camera 118, and the position of the tracking device 130 on the HMD map is localized or re-localized.

In some embodiments, the client processor 132 performs the operation S330. In some embodiments, the client processor 132 downloads the HMD map from the HMD device 110 and stores the HMD map in the client memory 134.

With the operations of the control method 300 as mentioned above, the difference between the host camera 118 and the client camera 138 are corrected by showing the marker X on a position corresponding to the capability of the host camera 118 and by aligning the tracking device 130 to the marker X, the accuracy of the localization of the tracking device 130 is higher. Moreover, the way of localizing the tracking device 130 with the HMD map is easy for the user.

Figure 5:
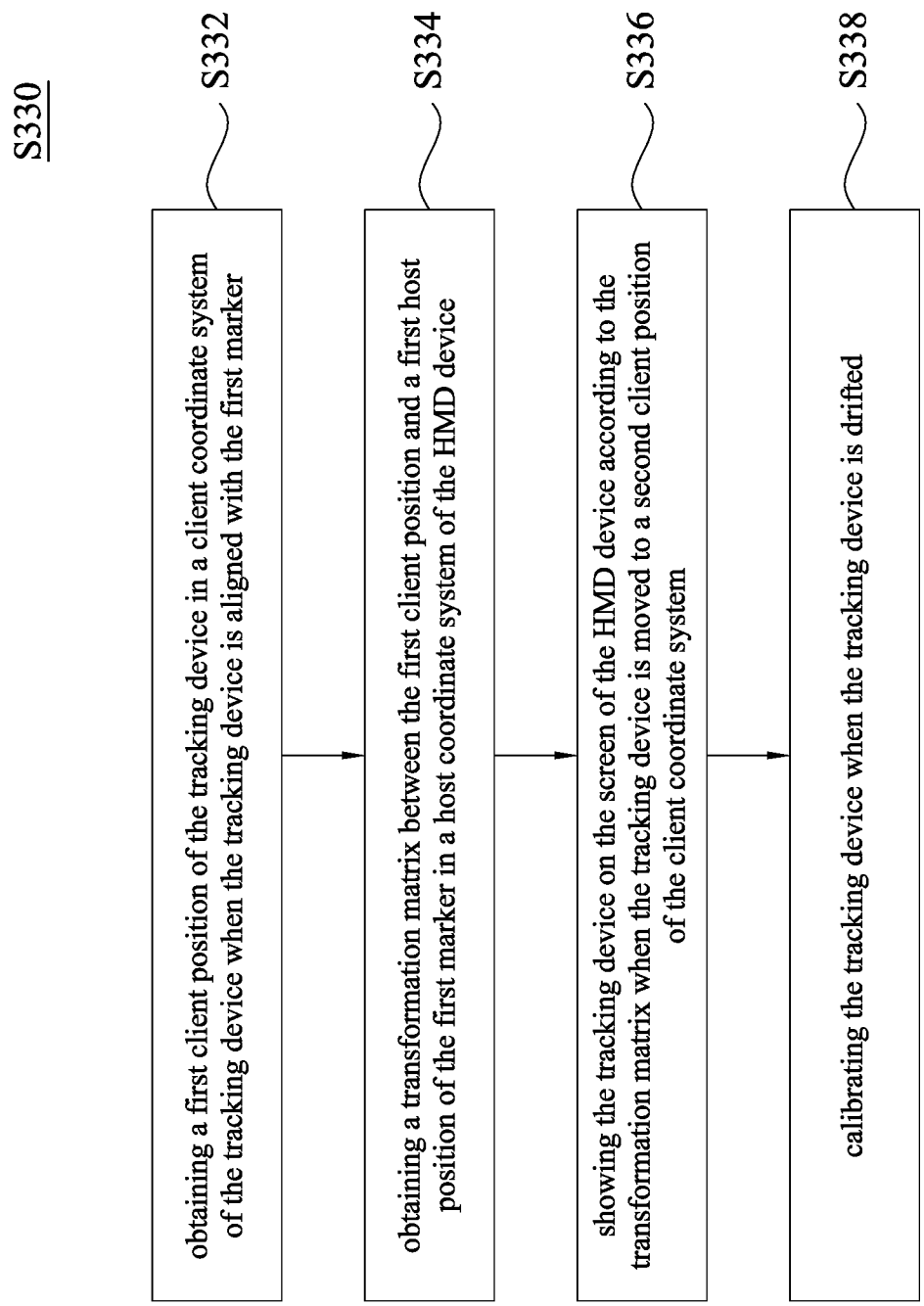
FIG. 5 is a schematic diagram illustrating a flow chart of an operation as illustrated in FIG. 3 according to some embodiments of the present disclosure.

Reference is made to FIG. 5. FIG. 5 is a schematic diagram illustrating a flow chart of operation S330 as illustrated in FIG. 3 according to some embodiments of the present disclosure. Operation S330 includes operations S332 to S338.

In operation S332, a first client position of the tracking device in a client coordinate system of the tracking device is obtained when the tracking device is aligned with the first marker. In some embodiments, operation S332 is performed by the client processor 132 as illustrated in FIG. 2.

Reference is made to FIG. 2 and FIG. 4 at the same time. For example, in some embodiments, the host screen 119 as illustrated in FIG. 2 shows the marker X at point B as illustrated in FIG. 4. The HMD device 110 asks the user to move the tracking device 130 to align the tracking device 130 to the point B as shown on the host screen 119. When the position of the tracking device 130 is aligned with the marker X on the host screen 119, the tracking device 130 sents the client position C1 to the HMD device 110. The client position C1 is the position of the tracking device 130 in a client coordinate system of the tracking device 130.

In operation S334, a transformation matrix between the first client position and a first host position of the first marker in a host coordinate system of the HMD device is obtained. In some embodiments, operation S334 is performed by the host processor 112 as illustrated in FIG. 2.

Reference is made to FIG. 2 and FIG. 4 at the same time. For example, assume that when the tracking device 130 is aligned with the marker X at point B as shown on the host screen 119, the client position of the tracking device 130 in the client coordinate system is the client position CB, and the host position of the point B in the host coordinate system of the HMD device 110 is the host position H1, the host processor 112 obtains a transformation relationship between the client position C1 and the host position C1. In some embodiments, the transformation relationship between the client position C1 and the host position H1 is a transformation matrix T1.

The relationship between the transformation matrix T1, the host position H1 and the client position C1 is as follows:

$$C1 \times T1 = H1.$$

In some embodiments, the host processor 112 obtains the transformation matrix T1 between the client position C1 and the host position H1 by dividing the host position H1 by the client position C1, as follows:

$$T1 = H1/C1.$$

In operation S336, the tracking device on the screen of the HMD device is shown according to the transformation matrix when the tracking device is moved to a second client position of the client coordinate system. In some embodiments, operation S336 is performed by the host processor 112 as illustrated in FIG. 2.

Reference is made to FIG. 2 and FIG. 4 at the same time. For example, when the tracking device 130 is moved to another client position C2 of the client coordinate system. The client processor 132 sends the client position C2 of the client coordinate system to the HMD device 110. The host processor 112 obtains a host position H2 of the tracking device 130 in the host coordinate system according to the transformation matrix T1 and the client position C2.

In some embodiments, the host position H2 is obtained by multiplying the transformation matrix T1 and the client position C2, as follows:

$$H2 = T1 \times C2.$$

After the host position H2 corresponding to the client position C2 is obtained, the host processor 112 shows the tracking device 130 on the host position H2 of the host screen 119 of the HMD device 110. For example, the host processor 112 shows the tracking device 130 at point C with the host position H2 on the host screen 119.

In some embodiments, in operations S332 to S336, the client positions and the host positions mentioned above are 3D coordinates. The client positions are coordinates of the client coordinate system, and the host positions are coordinates of the host coordinate system. Both of the client coordinate system and the host coordinate system are 3D coordinate systems.

In some embodiments, the operations S332 to S336 are operated in an OOBE (out of box experience) stage of operating the virtual reality system 100. With operations S332 to S336, it's easy for the tracking device 130 in a client coordinate system to be aligned with the host coordinate system. For a user operating the virtual reality system 100 in an initial stage, the user experience is better.

In operation S338, the tracking device is calibrated when the tracking device is drifted. In some embodiments, operation S338 is performed by the host processor 112 as illustrated in FIG. 2.

In some embodiments, when the user operates the virtual reality system 100 for a while, the user may find the tracking device 130 drifted and that the tracking device 130 is in an incorrect position. In this situation, the user could trigger a calibration process of operation S338. In some other embodiments, the calibration process of operation S338 is triggered automatically by the host processor 112 as illustrated in FIG. 2.

Reference is made to FIG. 2 and FIG. 6 at the same time. FIG. 6 is a schematic diagram illustrating a calibration process 600 according to some embodiments of the present disclosure. In some embodiments, in operation S338, when a calibration process is triggered, the host screen 119 of the HMD device 110 shows a marker X at the point D and the host processor 112 asks the user to align the tracking device 130 to the marker X shown at the point D.

It should be noted that the point D as mentioned above is for illustrative purposes only, and the marker X can be shown at any points of the host screen 119.

After the tracking device 130 is aligned with the marker X shown at the point D, the host processor 112 obtains a transformation relationship between a host position H3 of the point D and a client position C3 of the tracking device 130. It should be noted that in operation S338, the host position and the client position may be in the same coordinate system or in different coordinate systems. That is, in some embodiments, both of the host position and the client position are in the host coordinate system. In some embodiments, the host position is in the host coordinate system and the client position is in the client coordinate system.

In some embodiments, the transformation relationship is a transformation matrix T2. The relationship between the transformation matrix T2, the host position H3 and the client position C3 is as follows:

$$C3 \times T2 = H3.$$

In some embodiments, the host processor 112 obtains the transformation matrix T2 between the client position C3 and the host position H3 by dividing the host position H3 by the client position C3, as follows:

$$T2 = H3/C3.$$

After the transformation matrix T2 is obtained, when the tracking device 130 is moved to another client position C4 of the client coordinate system. The client processor 132 sends the client position C4 of the client coordinate system to the HMD device 110. The host processor 112 obtains a host position H4 of the tracking device 130 in the host coordinate system according to the transformation matrix T2 and the client position C4.

In some embodiments, the host position H4 is obtained by multiplying the transformation matrix T2 and the client position C4, as follows:

$$H4 = T2 \times C4.$$

After the host position H4 corresponding to the client position C4 is obtained, the host processor 112 shows the tracking device 130 on the host position H4 of the host screen 119 of the HMD device 110. For example, the host processor 112 shows the tracking device 130 at point E with the host position H4 on the host screen 119.

In some embodiments, in operation S338, the host processor 112 further asks the user to confirm whether the tracking device 130 shown at the point E with the host position H4 is correct or not. If the racking device 130 shown on the host position H4 is wrong, the host processor 112 operates the calibration process again.

Operation S338 provides a method for tracking device 130 to calibrate drifting, and the operation method is easy for a user operating the virtual reality system 100.

In some embodiments, the control method 300 is applied in an initial stage or in a OOBE (out of box experience) stage of operating the virtual reality system 100, and it is an easy way for the user to set up the racking device 130 with the HMD map.

It should be noted that, the client positions and the host positions mentioned above are coordinates of the client coordinate system or the host coordinate system. Both of the client coordinate system and the host coordinate system are 3D coordinate systems.

The embodiments of the present disclosure provide a control method, a virtual reality system, and a non-transitory computer readable storage medium, by showing a marker on the host screen according to a capability of a camera of the HMD device and asking the user to align the tracking device with the marker, it is easier for the tracking device to be localized or re-localized with the HMD map constructed by the HMD device. Also, by constructing the transformation matrix between the host position of the marker and the client position of the tracking device when the tracking device is aligned with the marker shown on the host screen, it provides an easy way to set up the tracking device to the host coordinate system of the HMD device on the initial stage, and it's also an easy way to calibrate the tracking device when drifting occurs.

In some embodiments, the host processor 112 and the client processor 132 can be, but are not limited to being, a single processor or an integration of multiple microprocessors such as CPUs or GPUs. The microprocessors are electrically coupled to the memory in order to access the at least one instruction. According to the at least one instruction, the above-mentioned control method can be performed. In some embodiments, the memory (the host memory 114 or the client memory 134) can be a flash memory, a HDD, a SSD (Solid State Disk), a DRAM (Dynamic Random Access Memory) or a SRAM (Static Random-Access Memory). In some embodiments, each of the host memory 114 and the client memory 134 can be a non-transitory computer readable medium stored with at least one instruction associated with a control method and further with a SLAM circuit or a SLAM module. The at least one instruction can be accessed and executed by the host processor 112 or the client processor 132.

In some embodiments, the host camera 118 and the client camera 138 can be elements or circuits with functions of image capturing or similar functions. In some embodiments, the host screen can be elements or circuits with functions of images displaying or similar functions. In some embodiments, the host I/O circuit 116 and the client I/O circuit 136 can be elements or circuits with functions of data/signal sending and receiving.

In addition, it should be noted that in the operations of the above mentioned control method 300, no particular sequence is required unless otherwise specified. Moreover, the operations may also be performed simultaneously or the execution times thereof may at least partially overlap.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for a virtual reality system comprising a HMD device (head-mounted display device) and a tracking device, wherein the HMD device and the tracking device are separate devices, and both of the HMD device and the tracking device work with a SLAM system, wherein the control method comprises:
    showing a first marker on a location of a host screen of the HMD device, wherein the first marker is generated according to a capability of a host camera of the HMD device, wherein the location of the first marker on the host screen corresponds to the capability of the host camera, wherein the capability of the host camera comprises a placement angle of the host camera relative to the host screen, wherein when the capability of the host camera comprises a first placement angle relative to the host screen, the first marker is shown on a first position on the host screen, and when the capability of the host camera comprises a second placement angle relative to the host screen, the first marker is shown on a second position on the host screen;
    downloading and storing an HMD map from the HMD device by the tracking device, wherein the HMD map is generated according to the capability of the host camera; and
    obtaining the capability of the host camera and localizing the tracking device with the HMD map of the HMD device by the tracking device when the tracking device is aligned with the first marker, and correcting a difference between the capability of the host camera and a capability of a client camera of the tracking device so that the HMD map is suitable for the tracking device when the capability of the client camera is different from the capability of the host camera, wherein the capability of the client camera comprises a placement angle of the client camera relative to a client screen of the client camera.

2. The control method of claim 1, further comprising:
    obtaining a first client position of the tracking device in a client coordinate system of the tracking device when the tracking device is aligned with the first marker;
    obtaining a transformation matrix between the first client position and a first host position of the first marker in a host coordinate system of the HMD device; and
    showing the tracking device on the host screen of the HMD device according to the transformation matrix when the tracking device is moved to a second client position of the client coordinate system.

3. The control method of claim 2, further comprising:
    obtaining and sending the first client position and the second client position to the HMD device by the tracking device.

4. The control method of claim 2, further comprising:
    obtaining a second host position of the tracking device in the host coordinate system according to the transformation matrix and the second client position when the tracking device moves to the second client position; and showing the tracking device on the host screen of the HMD device on the second host position.

5. The control method of claim 4, further comprising:
obtaining the second host position by multiplying the second client position and the transformation matrix.

6. The control method of claim 1, further comprising:
calibrating the tracking device when the tracking device is drifted, comprising:
  aligning the tracking device to a second marker shown on the host screen of the HMD device;
  obtaining a transformation relationship between a first host position of the second marker and a first client position of the tracking device; and
  showing the tracking device on a second host position on the host screen according to a second client position and the transformation relationship when the tracking device moves to the second client position;
  wherein the first client position and the second client position are sent from the tracking device to the HMD device.

7. The control method of claim 6, wherein the first host position, the first client position, the second host position, and the second client position are located in a host coordinate system of the HMD device.

8. A virtual reality system, comprising:
a HMD device, comprising:
  a host memory, configured to store an HMD map; and
  a host processor, coupled to the host memory and configured to show a first marker on a location of a host screen of the HMD device, wherein the first marker is generated according to a capability of a host camera of the HMD device, wherein the location of the first marker on the host screen corresponds to the capability of the host camera, wherein the capability of the host camera comprises a placement angle of the host camera relative to the host screen, wherein when the capability of the host camera comprises a first placement angle relative to the host screen, the first marker is shown on a first position on the host screen, and when the capability of the host camera comprises a second placement angle relative to the host screen, the first marker is shown on a second position on the host screen; and
a tracking device, communicatively connected to the HMD device, comprising:
  a client processor, configured to:
    download and store the HMD map from the HMD device by the tracking device, wherein the HMD map is generated according to the capability of the host camera; and
    obtain the capability of the host camera and localize the tracking device with the HMD map when the tracking device is aligned with the first marker and correct a difference between the capability of the host camera and a capability of a client camera of the tracking device so that the HMD map is suitable for the tracking device when the capability of the client camera is different from the capability of the host camera, wherein the capability of the client camera comprises a placement angle of the client camera relative to a client screen of the client camera;

wherein the HMD device and the tracking device are separate devices, and both of the HMD device and the tracking device work with a SLAM system.

9. The virtual reality system of claim 8, wherein the client processor is further configured to obtain a first client position of the tracking device in a client coordinate system of the tracking device when the tracking device is aligned with the first marker, and to send the first client position to the HMD device.

10. The virtual reality system of claim 9, wherein the host processor is further configured to obtain a transformation matrix between the first client position and a first host position of the first marker in a host coordinate system of the HMD device, and to show the tracking device on the host screen of the HMD device according to the transformation matrix when the tracking device is moved to a second client position of the client coordinate system.

11. The virtual reality system of claim 10, wherein the host processor is further configured to obtain a second host position of the tracking device in the host coordinate system according to the transformation matrix and the second client position when the tracking device moves to the second client position, and to show the tracking device on the host screen of the HMD device on the second host position.

12. The virtual reality system of claim 11, wherein the host processor is further configured to obtain the second host position by multiplying the second client position and the transformation matrix.

13. The virtual reality system of claim 8, wherein the host processor is further configured to calibrate the tracking device when the tracking device is drifted, to obtain a transformation relationship between a first host position of a second marker shown on the host screen and a first client position of the tracking device when the tracking device is aligned to the second marker, and to show the tracking device on a second host position on the host screen according to a second client position and the transformation relationship when the tracking device moves to the second client position.

14. The virtual reality system of claim 13, wherein the first host position, the first client position, the second host position, and the second client position are located in a host coordinate system of the HMD device.

15. A non-transitory computer readable storage medium with a computer program to execute a control method, wherein the control method comprises:
showing a first marker on a location of a host screen of a HMD device, wherein the first marker is generated according to a capability of a host camera of the HMD device, wherein the location of the first marker on the host screen corresponds to the capability of the host camera, wherein the capability of the host camera comprises a placement angle of the host camera relative to the host screen, wherein when the capability of the host camera comprises a first placement angle relative to the host screen, the first marker is shown on a first position on the host screen, and when the capability of the host camera comprises a second placement angle relative to the host screen, the first marker is shown on a second position on the host screen;
downloading and storing an HMD map from the HMD device by a tracking device, wherein the HMD map is generated according to the capability of the host camera; and
obtaining the capability of the host camera and localizing the tracking device with the HMD map of the HMD device by the tracking device when the tracking device is aligned with the first marker, and correcting a difference between the capability of the host camera and a capability of a client camera of the tracking device so that the HMD map is suitable for the tracking device when the capability of the client camera is different from the capability of the host camera, wherein the capability of the client camera comprises a placement angle of the client camera relative to a client screen of the client camera;

wherein the HMD device and the tracking device are separate devices, and both of the HMD device and the tracking device work with a SLAM system.

16. The non-transitory computer readable storage medium of claim 15, wherein the control method further comprises:
obtaining a first client position of the tracking device in a client coordinate system of the tracking device when the tracking device is aligned with the first marker;
obtaining a transformation matrix between the first client position and a first host position of the first marker in a host coordinate system of the HMD device; and
showing the tracking device on the host screen of the HMD device according to the transformation matrix when the tracking device is moved to a second client position of the client coordinate system.

17. The non-transitory computer readable storage medium of claim 16, wherein the control method further comprises:
obtaining a second host position of the tracking device in the host coordinate system by multiplying the second client position and the transformation matrix when the tracking device moves to the second client position; and
showing the tracking device on the host screen of the HMD device on the second host position.

18. The non-transitory computer readable storage medium of claim 15, wherein the control method further comprises:
calibrating the tracking device when the tracking device is drifted, comprising:
aligning the tracking device to a second marker shown on the host screen of the HMD device;
obtaining a transformation relationship between a first host position of the second marker and a first client position of the tracking device; and
showing the tracking device on a second host position on the host screen according to a second client position and the transformation relationship when the tracking device moves to the second client position;
wherein the first client position and the second client position are sent from the tracking device to the HMD device, and the first host position, the first client position, the second host position, and the second client position are located in a host coordinate system of the HMD device.

* * * * *